US011236529B2

(12) United States Patent
Tse et al.

(10) Patent No.: US 11,236,529 B2
(45) Date of Patent: Feb. 1, 2022

(54) SECURITY APPARATUS FOR A PORTABLE ELECTRONIC DEVICE

(71) Applicant: ACCO Brands Corporation, Lake Zurich, IL (US)

(72) Inventors: Wilson Tse, Burnaby (CA); William De Meulenaere, Newark, CA (US); Michael Otsuka, Sunnyvale, CA (US); James Kao, Fremont, CA (US); Joseph A. Teresi, San Mateo, CA (US); Alex J. Klinkman, Hayward, CA (US); Todd C. Robinson, San Mateo, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 417 days.

(21) Appl. No.: 16/318,544

(22) PCT Filed: Aug. 3, 2017

(86) PCT No.: PCT/US2017/045346
§ 371 (c)(1),
(2) Date: Jan. 17, 2019

(87) PCT Pub. No.: WO2018/027061
PCT Pub. Date: Feb. 8, 2018

(65) Prior Publication Data
US 2019/0316385 A1 Oct. 17, 2019

Related U.S. Application Data

(60) Provisional application No. 62/371,546, filed on Aug. 5, 2016.

(51) Int. Cl.
*E05B 73/00* (2006.01)
*H01R 13/639* (2006.01)

(52) U.S. Cl.
CPC ..... *E05B 73/0082* (2013.01); *H01R 13/6397* (2013.01)

(58) Field of Classification Search
CPC . H01R 13/6397; E05B 73/0082; E05B 73/00; E05B 73/0005; F16B 19/109
(Continued)

(56) References Cited

U.S. PATENT DOCUMENTS 1,244,848 A * 10/1917 Gadke ................... F16D 1/0894
403/355
3,312,138 A * 4/1967 Cumming ............. E21D 21/008
411/21
(Continued)

FOREIGN PATENT DOCUMENTS

TW 201229373 A1 7/2012
WO 2011133809 A1 10/2011

OTHER PUBLICATIONS

International Search Report and Written Opinion for Application No. PCT/US2017/045346 dated Nov. 15, 2017 (11 pages).
(Continued)

*Primary Examiner* — Lloyd A Gall
(74) *Attorney, Agent, or Firm* — Michael Best & Friedrich LLP

(57) ABSTRACT

A security apparatus for a portable electronic device having a slot includes a body having an insertable portion configured to be inserted into the slot of the portable electronic device, and a boss extending from the insertable portion and positioned outside of the slot. The boss is configured to attach to a lock head. The security apparatus also includes a wedge supported at least partially within the insertable portion of the body. The wedge is movable relative to the insertable portion between a first position, in which the wedge extends out of the insertable portion and is configured to engage a surface of the portable electronic device that
(Continued)

defines the slot, and a second position, in which the wedge is retracted relative to the first position and is configured to disengage the surface of the portable electronic device that defines the slot.

18 Claims, 15 Drawing Sheets

(58) Field of Classification Search
USPC .................. 70/14, 49, 58; 411/347, 348; 361/679.57, 679.58
See application file for complete search history.

(56) References Cited

U.S. PATENT DOCUMENTS

| | | | | |
|---|---|---|---|---|
| 3,933,390 | A * | 1/1976 | Barrett | B63C 7/16 294/94 |
| 4,453,845 | A * | 6/1984 | Donan, Jr. | E21D 21/008 405/259.3 |
| 4,501,520 | A * | 2/1985 | Bergner | F16B 13/065 411/21 |
| 4,553,890 | A * | 11/1985 | Gulistan | F16B 41/002 411/318 |
| 4,671,718 | A * | 6/1987 | Eakin | B21J 15/42 24/606 |
| 4,673,320 | A * | 6/1987 | Froehlich | F16B 13/12 411/21 |
| 4,863,205 | A * | 9/1989 | Schron | B66C 1/54 294/82.28 |
| 5,803,689 | A * | 9/1998 | Magnus | E21B 41/0007 411/355 |
| 5,931,621 | A * | 8/1999 | Griffith | F16B 39/02 411/255 |
| 6,257,029 | B1 * | 7/2001 | Liao | E05B 73/0005 248/551 |
| 6,401,502 | B1 | 6/2002 | Yang | |
| 7,997,106 | B2 | 8/2011 | Mahaffey et al. | |
| 8,001,812 | B2 | 8/2011 | Mahaffey et al. | |
| 8,640,510 | B1 | 2/2014 | Derman | |
| 8,720,874 | B2 * | 5/2014 | Tschida | F16B 19/109 269/48.1 |
| 8,842,422 | B2 | 9/2014 | Hung et al. | |
| 9,137,911 | B2 | 9/2015 | Avganim | |
| 9,187,934 | B1 * | 11/2015 | Lee | E05B 73/0017 |
| 9,303,674 | B2 * | 4/2016 | Demmeler | F16B 19/109 |
| 9,845,143 | B2 * | 12/2017 | Neal | F16B 21/165 |
| 2004/0093916 | A1 | 5/2004 | Ling | |
| 2007/0037454 | A1 | 2/2007 | Bushby | |
| 2007/0169523 | A1 * | 7/2007 | Lu | E05B 73/0082 70/58 |
| 2008/0034816 | A1 * | 2/2008 | Lu | E05B 73/0082 70/58 |
| 2008/0053168 | A1 * | 3/2008 | Lu | E05B 73/0005 70/58 |
| 2009/0235699 | A1 | 9/2009 | Hsiao et al. | |
| 2010/0180648 | A1 * | 7/2010 | Knox | E05B 73/0082 70/58 |
| 2010/0300158 | A1 * | 12/2010 | Andres | E05B 73/0005 70/58 |
| 2013/0180295 | A1 | 7/2013 | Avganim | |
| 2014/0026625 | A1 | 1/2014 | Wu et al. | |
| 2014/0085788 | A1 * | 3/2014 | Avganim | G06F 1/1656 361/679.01 |
| 2015/0271932 | A1 | 9/2015 | Avganim | |
| 2015/0368932 | A1 | 12/2015 | Mahaffey et al. | |
| 2016/0333613 | A1 * | 11/2016 | Avganim | E05B 73/0005 |
| 2017/0247916 | A1 * | 8/2017 | Kao | E05B 73/0082 |

OTHER PUBLICATIONS

Office Action and Search Report issued by the Taiwanese Intellectual Property Office for Application No. 106126434 dated Sep. 10, 2020 (11 pages including statement of relevance).
Extended European Search Report for Application No. 17837708.1 dated Mar. 4, 2020 (10 pages).

* cited by examiner

SECURITY APPARATUS FOR A PORTABLE ELECTRONIC DEVICE

RELATED APPLICATIONS

This application claims the benefit of U.S. Provisional Patent Application No. 62/371,546 filed on Aug. 5, 2016, the entire content of which is incorporated by reference herein.

FIELD OF THE INVENTION

The present invention relates to security apparatuses, such as locks, for portable electronic devices.

SUMMARY

In one aspect, the invention provides a security apparatus for a portable electronic device having a slot. The security apparatus includes a body having an insertable portion configured to be inserted into the slot of the portable electronic device, and a boss extending from the insertable portion and positioned outside of the slot. The boss is configured to attach to a lock head. The security apparatus also includes a wedge supported at least partially within the insertable portion of the body. The wedge is movable relative to the insertable portion between a first position, in which the wedge extends out of the insertable portion and is configured to engage a surface of the portable electronic device that defines the slot, and a second position, in which the wedge is retracted relative to the first position and is configured to disengage the surface of the portable electronic device that defines the slot.

In another aspect, the invention provides an anchor configured to be installed into a slot in a portable electronic device and to be subsequently engaged by a locking head of a lock in order to secure the portable electronic device to an immovable object. The anchor includes a body including an insertable portion configured to be inserted into the slot of the portable electronic device, and a boss extending from the insertable portion and positioned outside of the slot. The boss includes a cap, a ring structure, and an annular recess positioned between the cap and the ring structure such that the boss is configured to attach to a lock head. The anchor further includes a first tapered projecting member coupled to the insertable portion of the body, and a second tapered projecting member coupled to an opposite side of the insertable portion from the first tapered projecting member. The first and second tapered projecting members are movable relative to the insertable portion between an extended position, in which the tapered projecting members extend in opposite directions from within the insertable portion to engage respective surfaces of the portable electronic device that defines the slot, and a retracted position, in which the tapered projecting members retract within the insertable portion to disengage the respective surfaces of the portable electronic device that defines the slot.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
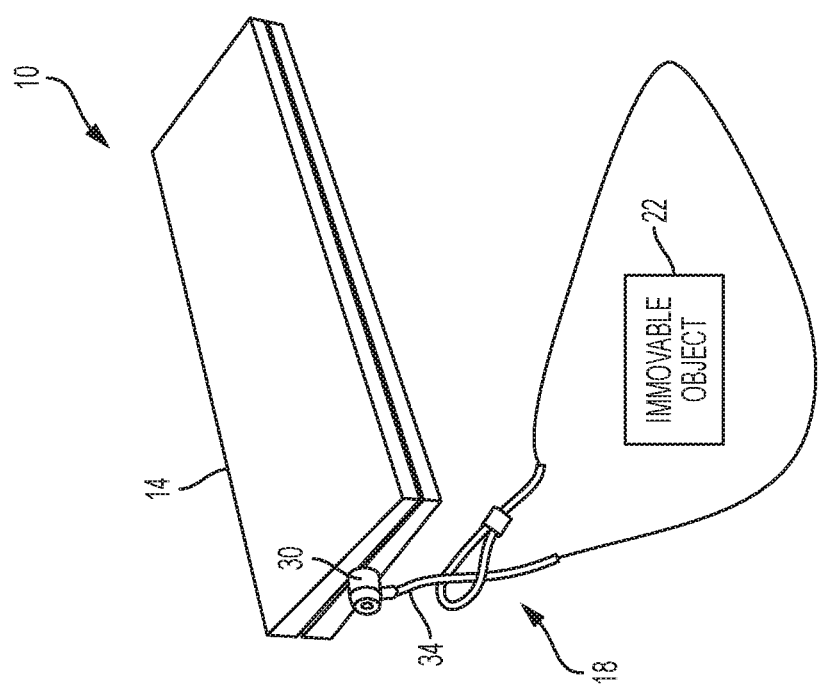
FIG. 1 is a perspective view of a system including a portable electronic device and a security apparatus securing the portable electronic device to an immovable object.

FIG. 1 illustrates a system 10 including a portable electronic device 14 and a security apparatus 18. The illustrated portable electronic device 14 is a laptop or notebook computer. In other embodiments, the portable electronic device 14 may be another type of device, such as a smartphone, a tablet computer, an eReader, a desktop computer, a docking station, a Chip & PIN machine, a USB hub, and the like.

Figure 2:
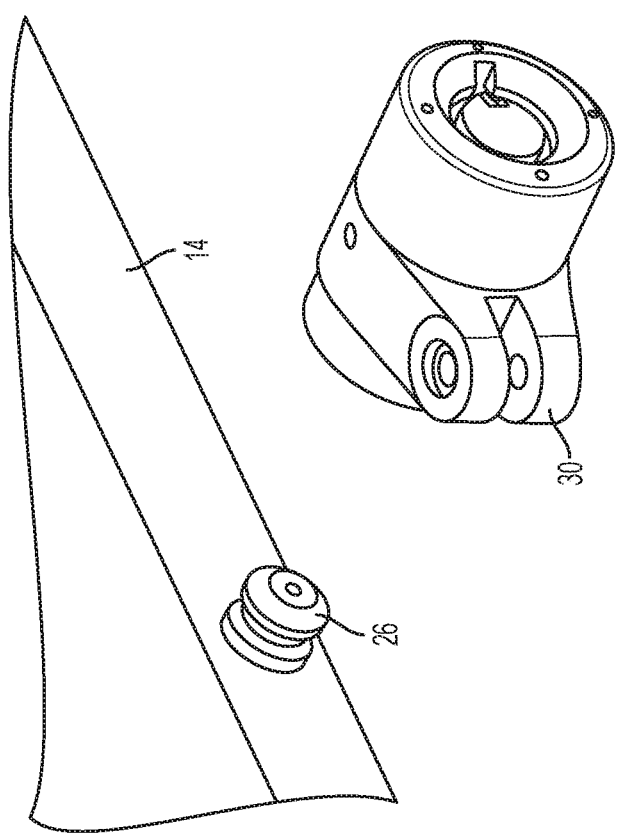
FIG. 2 is an enlarged perspective view of a portion of the portable electronic device and the security apparatus.

The security apparatus 18 attaches to the portable electronic device 14 to secure the device 14 to an immovable object 22. In the illustrated embodiment, the security apparatus 18 includes an anchor or adapter 26 (FIG. 2), a lock head 30, and a cable 34. As shown in FIG. 2, the anchor 26 is partially received in and attaches to a slot 38 (FIGS. 3-4) in the portable electronic device 14. The lock head 30 attaches to a portion of the anchor 26 to secure the lock head 30 to the portable electronic device 14. The cable 34 is attached to the lock head 30 and wraps around the immovable object 22 (as shown in FIG. 1) to secure the portable electronic device 14 in place. The immovable object 22 may be, for example, a desk, a chair, a wall, or other relatively secure structure. In some embodiments, the lock head 30 and the cable 34 may be similar to the ClickSafe® lock sold by Kensington and disclosed in U.S. Publication No. 2015/0368932, the entire contents of which are incorporated by reference herein.

Figure 4:
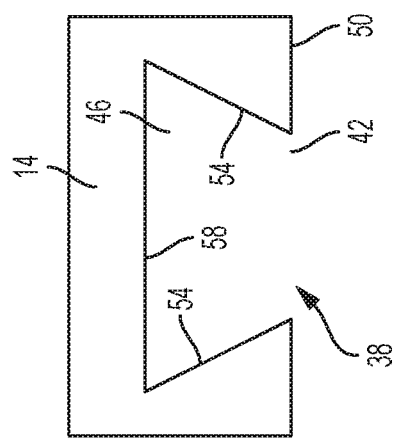
FIG. 4 is a cross-sectional view of a portion of the portable electronic device and the slot.
Figure 3:
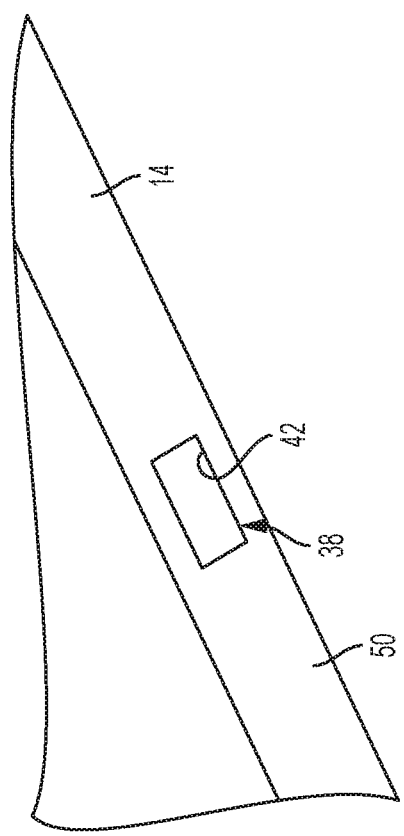
FIG. 3 is an enlarged perspective view of a portion of the portable electronic device, illustrating a slot in the portable electronic device.
Figure 5:
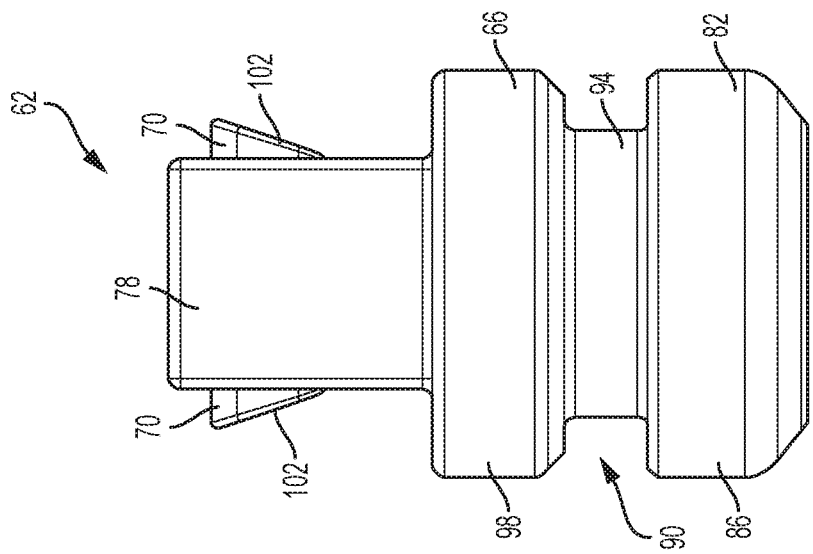
FIG. 5 is a perspective view of an anchor embodying the invention.
Figure 6:
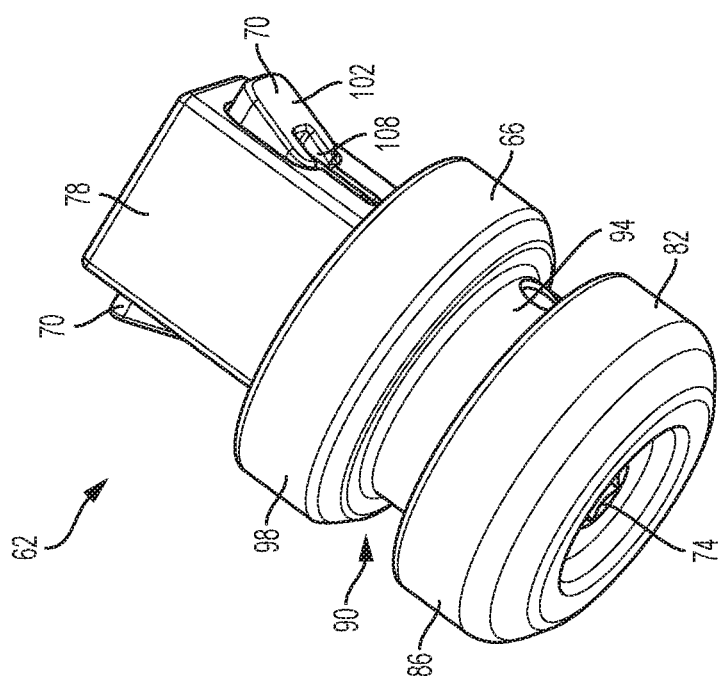
FIG. 6 is a plan view of the anchor of FIG. 5.

Referring to FIGS. 3 and 4, the slot 38 is formed in the portable electronic device 14 and has an opening 42 and a cavity 46. The opening 42 is formed in an outer surface 50 of the portable electronic device 14. As shown in FIG. 3, the opening 42 is generally rectangular, but may alternatively have other shapes (e.g., a rounded rectangle, square, circle, etc.). The cavity 46 extends from the opening 42 into the portable electronic device 14. The illustrated cavity 46 is defined by two side walls 54 and a rear wall 58 of the portable electronic device 14. Top and bottom walls (not shown) can also partially define the cavity 46. As shown in FIG. 4, the side walls 54 taper outwardly from the opening 42 toward the rear wall 58, giving the slot 38 a generally trapezoidal shape when viewed in cross-section. The rear wall 58 defines an end of the cavity 46 opposite the opening 42, but in some embodiments, the rear wall 58 may be omitted.

FIGS. 5-8 illustrate an anchor 62 of a security apparatus. The anchor 62 attaches to a portable electronic device and may be used with the lock head 30 and the cable 34 shown in FIG. 1. The illustrated anchor 62 includes a body 66, two wedges or tapered projecting members 70, and a fastener 74. The body 66 has an insertable portion 78 and a boss 82 extending from the insertable portion 78. The insertable portion 78 is shaped and sized to be inserted through the opening 42 (FIG. 3) of the slot 38 and into the cavity 46. In the illustrated embodiment, the insertable portion has a rectangular cross section. The illustrated boss 82 is generally cylindrical and includes an enlarged end or cap 86, an annular recess 90 defining a central cylinder 94, and a ring structure 98. When the insertable portion 78 is inserted into the slot 38, the boss 82 remains outside of the slot 38 and accessible. The boss 82 (with the cap 86 and the annular recess 90) is configured to interact with the lock head 30 (FIG. 1). In the illustrated embodiment, the insertable portion 78 and the boss 82 are integrally formed as a single piece. In other embodiments, the insertable portion 78 and the boss 82 may be separate pieces that are secured together.

The wedges 70 are supported by the insertable portion 78. Each wedge 70 is positioned at least partially within the insertable portion 78. Each wedge 70 also includes an engagement surface 102 that is obliquely angled relative to a longitudinal axis of the anchor 62. The engagement surfaces 102 are shaped to match the contour of the side walls 54 (FIG. 4) in the portable electronic device 14. A wire pin 106 is coupled to the body 66 to retain and/or bias the wedges 70 within the insertable portion 78. In the illustrated embodiment, one end of the wire pin 106 is positioned within a recess 108 formed at least partly within the engagement surface 102 while the other end of the wire pin 106 is retained/fixed within the insertable portion 78. Alternatively, the wire pin 106 can be a clip or spring that biases the wedges 70 radially inward.

The fastener 74 extends through the body 66 and selectively engages the wedges 70. In the illustrated embodiment, the fastener 74 is a set screw, although other suitable fasteners or movable members may alternatively be used. The illustrated fastener 74 includes a head 110 adjacent the boss 82, a stem 112 extending from the head 110 into the insertable portion 78, and a threaded portion 114. In the illustrated embodiment, the threaded portion 114 is formed on the head 110. In other embodiments, the threaded portion 114 may be formed on the stem 112. The fastener 74 is rotatable by a tool (e.g., an Allen wrench, a screwdriver, etc.) that engages the head 110 to move the fastener 74 within the body 66. As the fastener 74 rotates, the fastener 74 moves linearly along the longitudinal axis of the anchor 62, toward or away from the wedges 70 (depending on the direction of rotation). The illustrated fastener 74 also includes a flange 115 that selectively engages a shoulder pin 117, or other suitable projection, extending through the body 66 to limit movement of the fastener 74 out of the body 66.

Figure 7A:
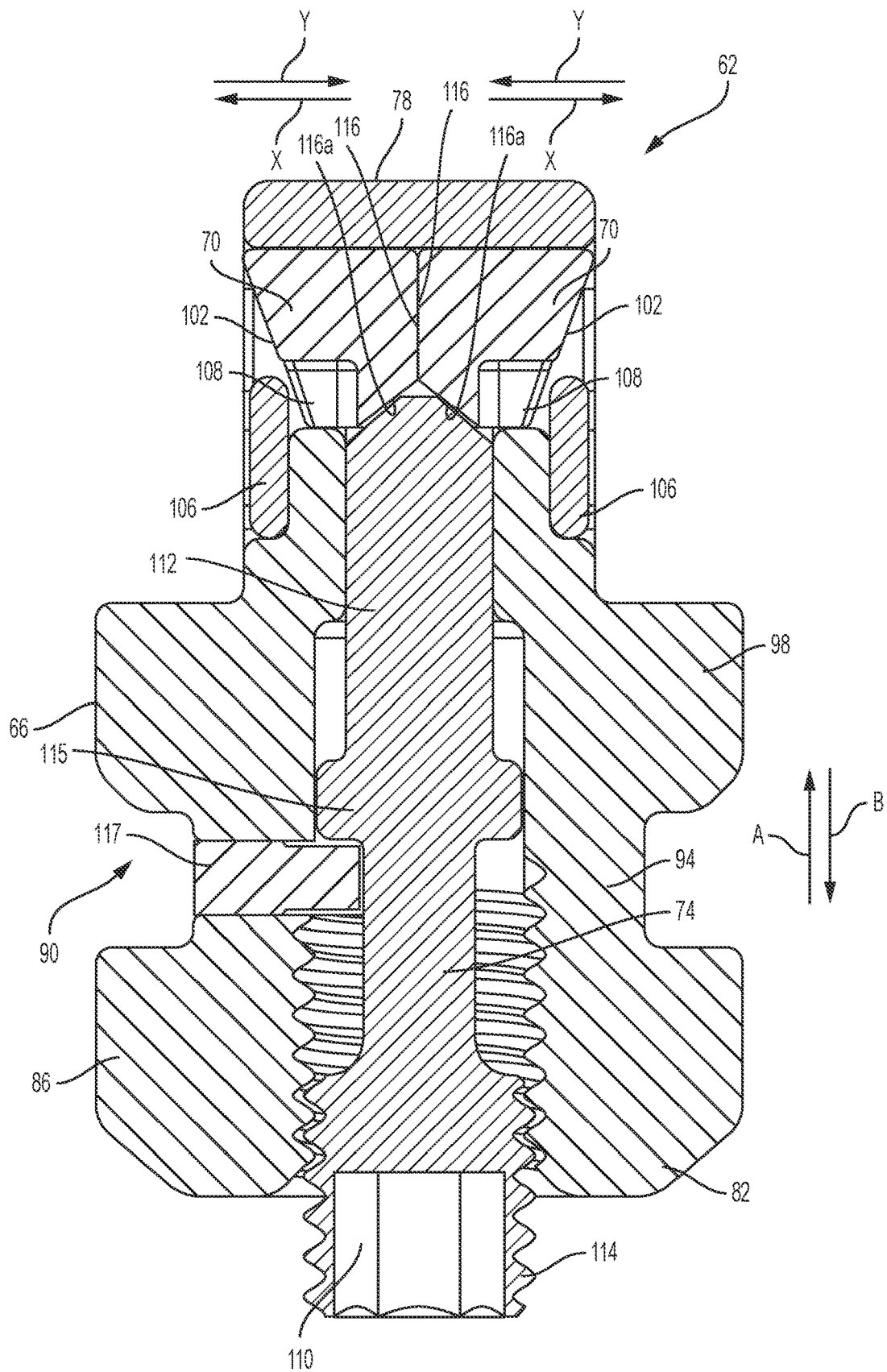
FIG. 7A is a cross-sectional view of the anchor of FIG. 5 while in a first position.
Figure 7B:
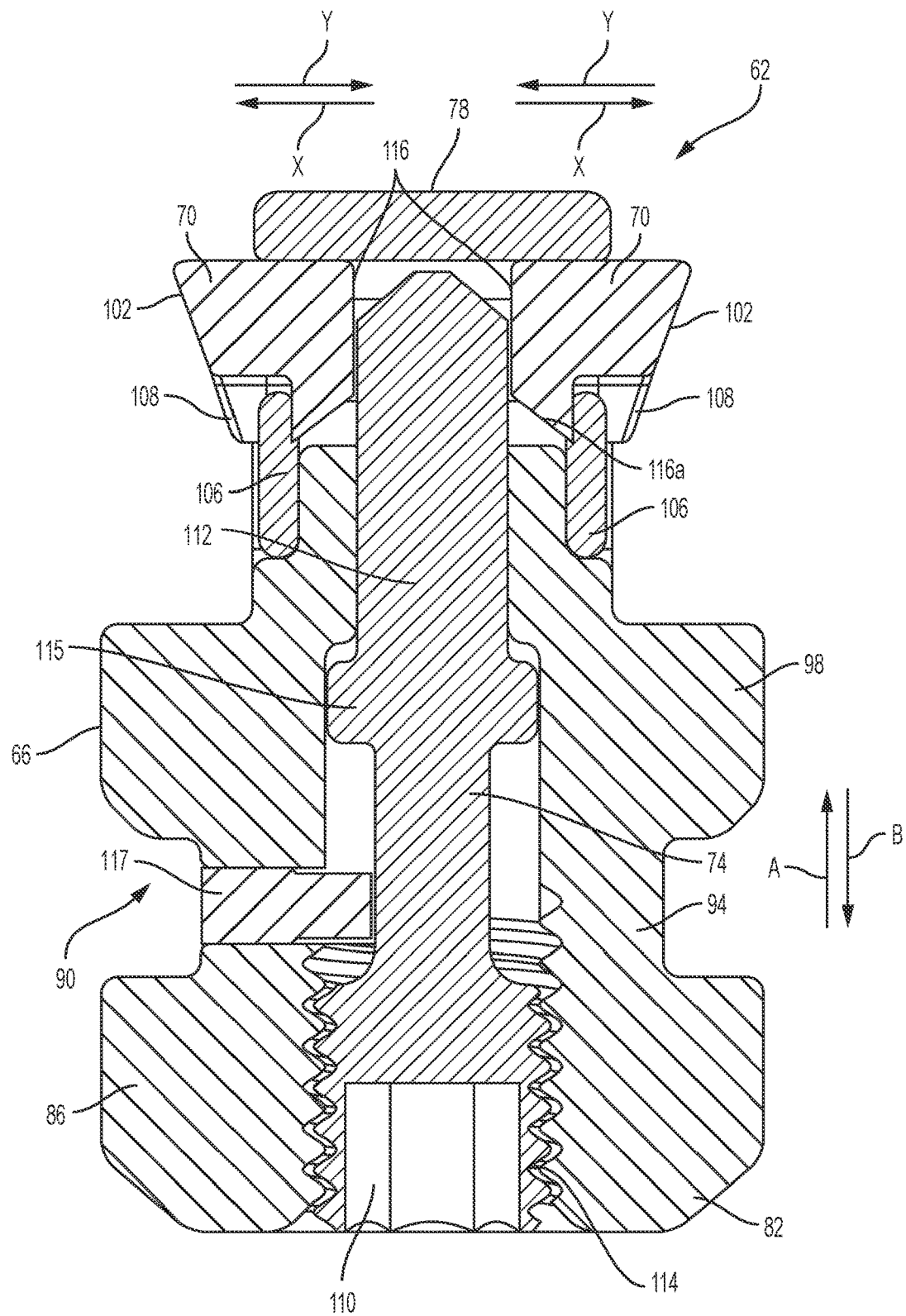
FIG. 7B is a cross-sectional view of the anchor of FIG. 5 while in a second position.
Figure 8:
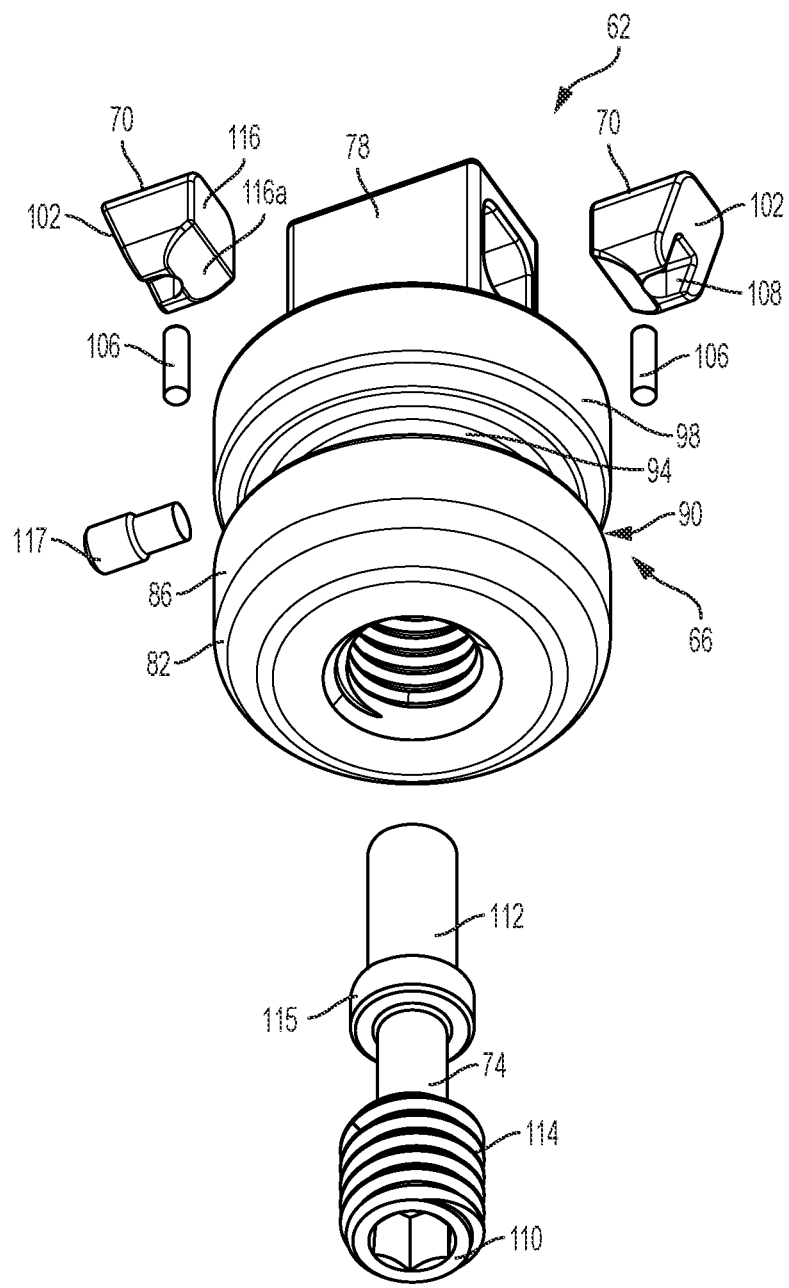
FIG. 8 is an exploded view of the anchor of FIG. 5.

Referring to FIGS. 7A and 7B, the anchor 62 is movable between a first or disengaged position (FIG. 7A) in which the wedges 70 are retracted into the insertable portion 78, and a second or engaged position (FIG. 7B) in which fastener 74 pushes the wedges 70 outward from the insertable portion 78. When the fastener 74 moves in the direction of arrow A, the distal end of the fastener 74 engages radially inwardly-facing surfaces 116 of the wedges 70 to push the wedges 70 radially outward (i.e., in the direction of arrows X). In the illustrated embodiment, the inwardly-facing surfaces 116 each include a tapered lead-in portion 116a to facilitate smooth extension of the wedges 70 upon initial engagement with the fastener 74. In the illustrated embodiment, the wedges 70 translate linearly away from one another in opposite directions. In other embodiments, the wedges 70 could pivot or rotate, or could undergo motion that is a combination of both translation and rotation.

In this extended position, the wedges 70 can engage the side walls 54 (FIG. 4) of the portable electronic device 14 to secure the anchor 62 within the slot 38. Because the wedges 70 extend and are secured in the extended position beyond the perimeter of the opening 42, the anchor 62 cannot be removed from the slot 38. When the fastener 74 moves in the direction of arrow B, the fastener 74 disengages the radially inwardly-facing surfaces 116 of the wedges 70, allowing the wedges 70 to be free of any load that would resist movement of the wedges 70 in the direction of arrows Y. Pulling on the boss 82 away from the slot 38 (i.e., in the direction of arrow B), allows the wedges 70 to move or retract radially inward (see FIG. 7A). In this position, the wedges 70 are positioned within or retracted into the insertable portion 78 so that the insertable portion 78 can be removed from or inserted into the slot 38 in the portable electronic device 14.

Figure 10:
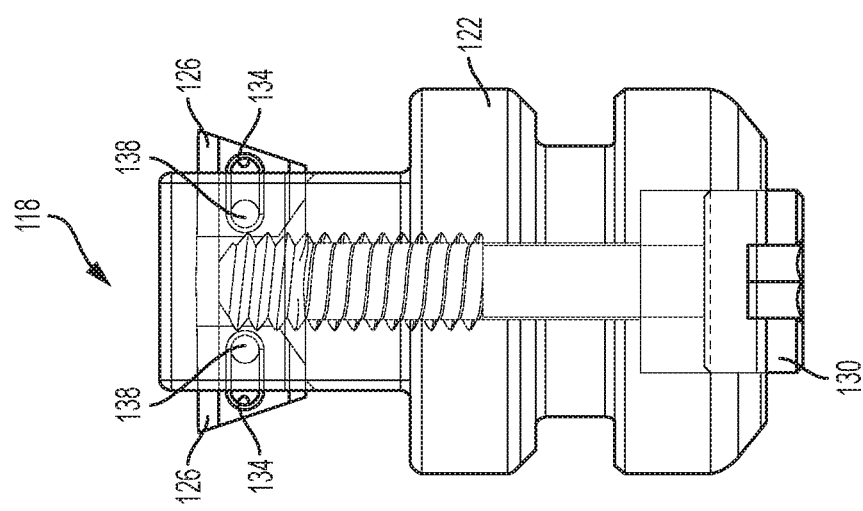
FIG. 10 is a cross-sectional view of the anchor of FIG. 9.
Figure 9:
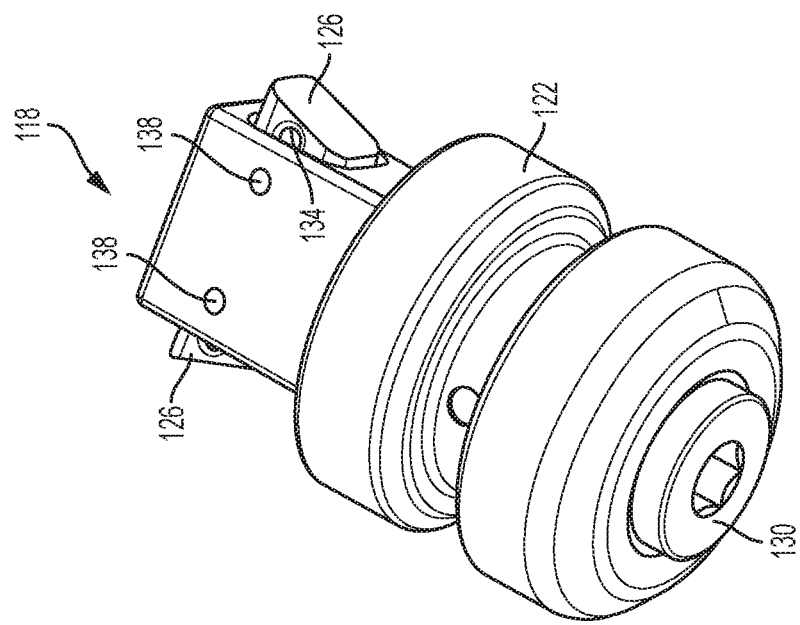
FIG. 9 is a perspective view of another anchor embodying the invention.

FIGS. 9-10 illustrate another anchor 118 of a security apparatus. The anchor 118 attaches to a portable electronic device and may be used with the lock head 30 and the cable 34 shown in FIG. 1. The anchor 118 is similar to the anchor 62 shown in FIGS. 5-8. Only differences between the anchors 62, 118 are described below.

The illustrated anchor 118 includes a body 122, two wedges or tapered projecting members 126, and a fastener 130. In the illustrated embodiment, each wedge 126 has an aperture, recess, or slot 134, and the body 122 has two pins 138 that extend into and/or through the apertures 134. The apertures 134 and the pins 138 form tracks along which the wedges 126 move radially outwardly/inwardly when the wedges 126 are respectively engaged/disengaged by the fastener 130. The pins 138 also retain the wedges 126.

Figure 12:
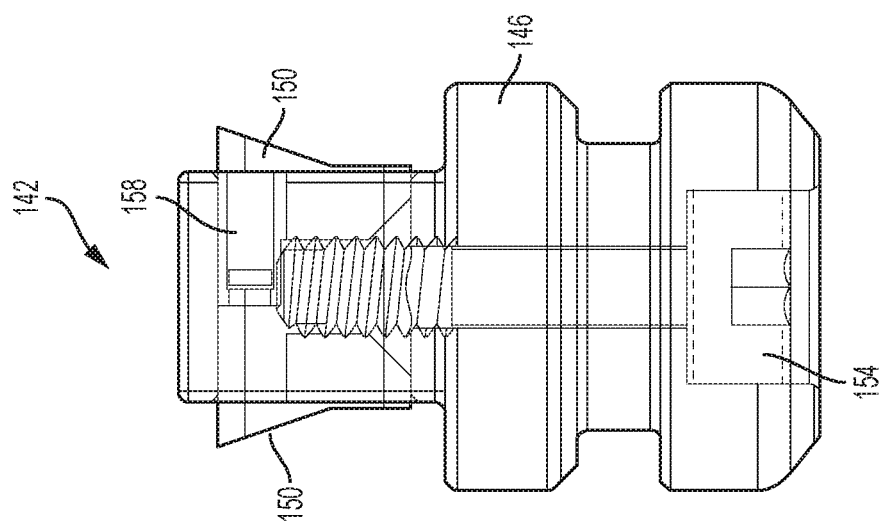
FIG. 12 is a cross-sectional view of the anchor of FIG. 11.
Figure 11:
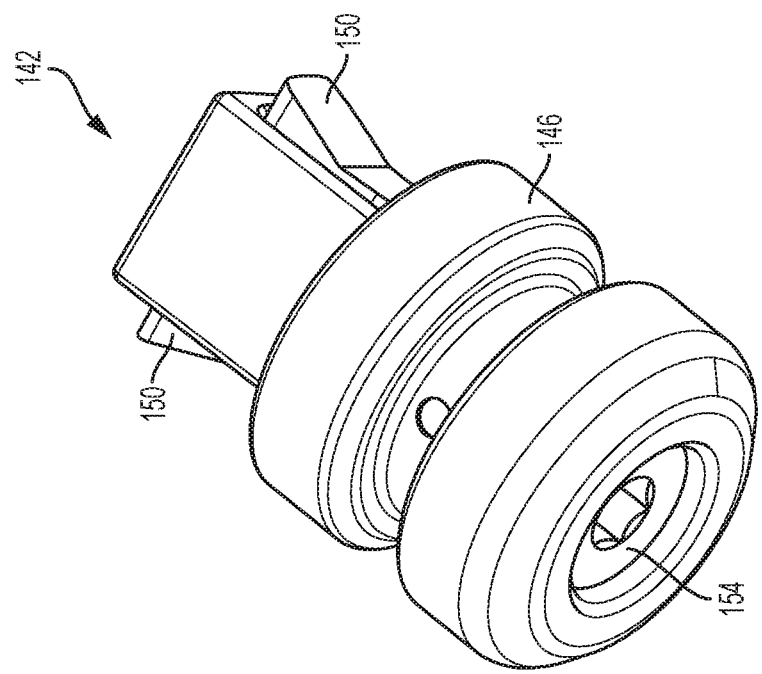
FIG. 11 is a perspective view of yet another anchor embodying the invention.
Figure 13:
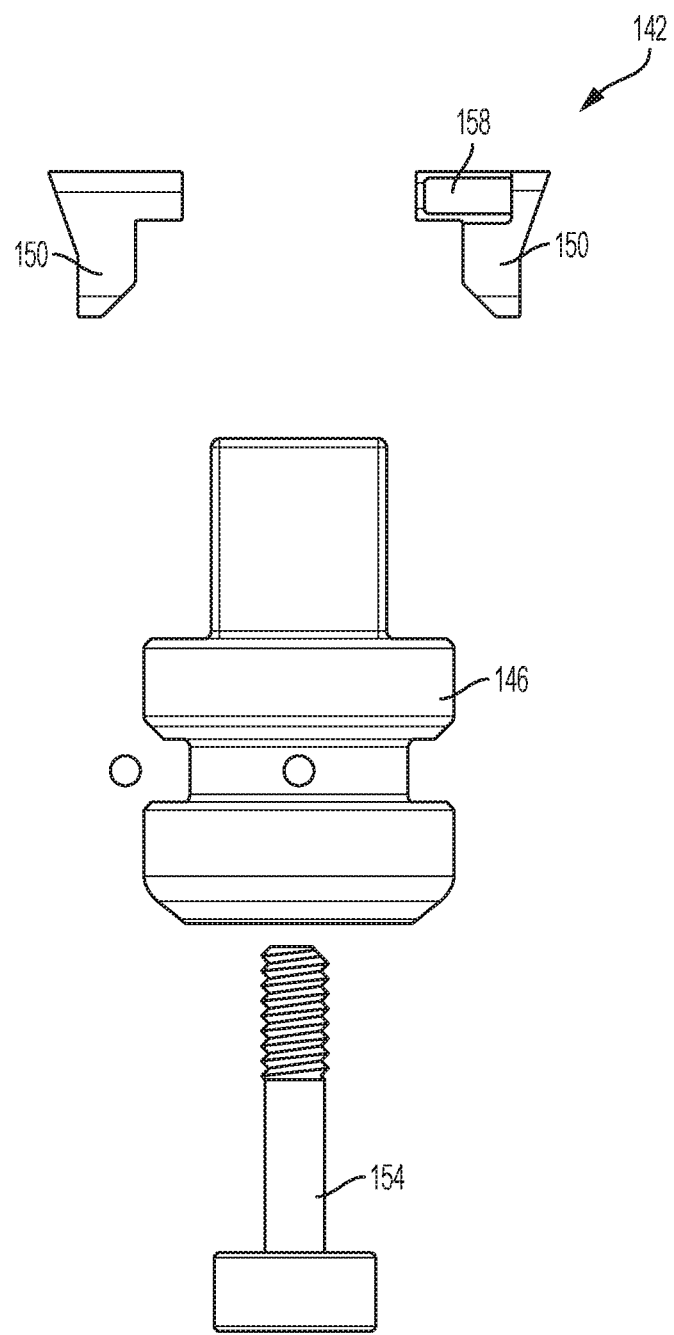
FIG. 13 is an exploded view of the anchor of FIG. 11.

FIGS. 11-13 illustrate another anchor 142 of a security apparatus. The anchor 142 attaches to a portable electronic device and may be used with the lock head 30 and the cable 34 shown in FIG. 1. The anchor 142 is similar to the anchor 62 shown in FIGS. 5-8. Only differences between the anchors 62, 142 are described below.

The illustrated anchor 142 includes a body 146, two wedges or tapered projecting members 150, and a fastener 154. As shown in FIG. 13, one of the wedges 150 includes a projection 158 that fits within a corresponding recess formed in the other wedge 150. The projection 158 and the recess form a track along which the wedges 150 move radially outwardly/inwardly when the wedges 150 are respectively engaged/disengaged by the fastener 154. The projection 158 and the recess also retain each wedge 150.

Figure 15:
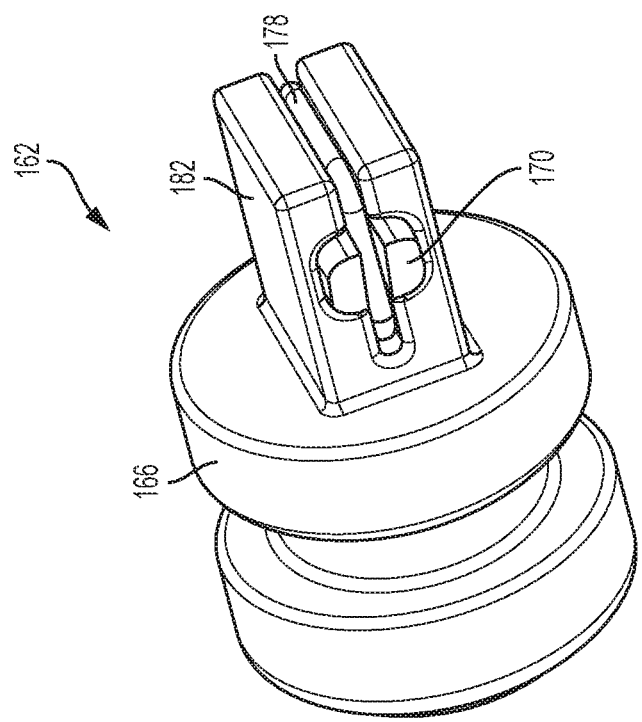
FIG. 15 is another perspective view of the anchor of FIG. 14.
Figure 14:
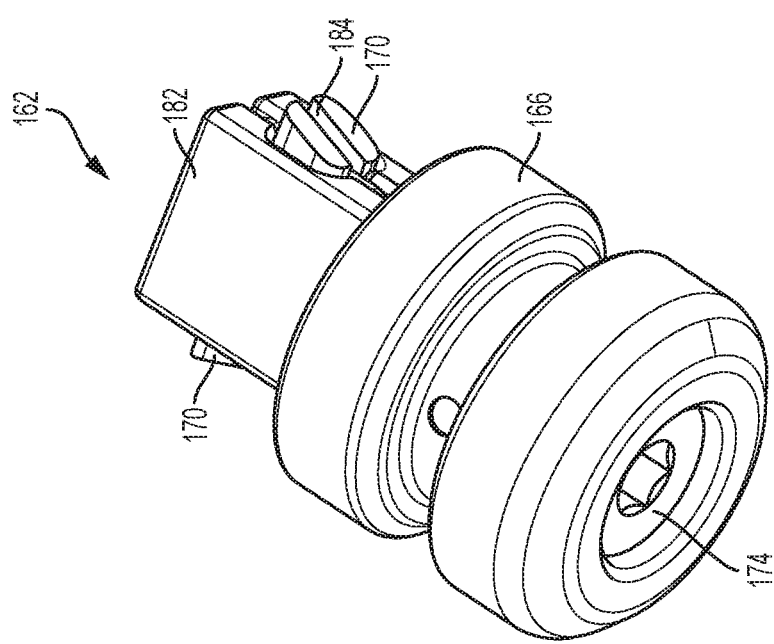
FIG. 14 is a perspective view of still another anchor embodying the invention.
Figure 16:
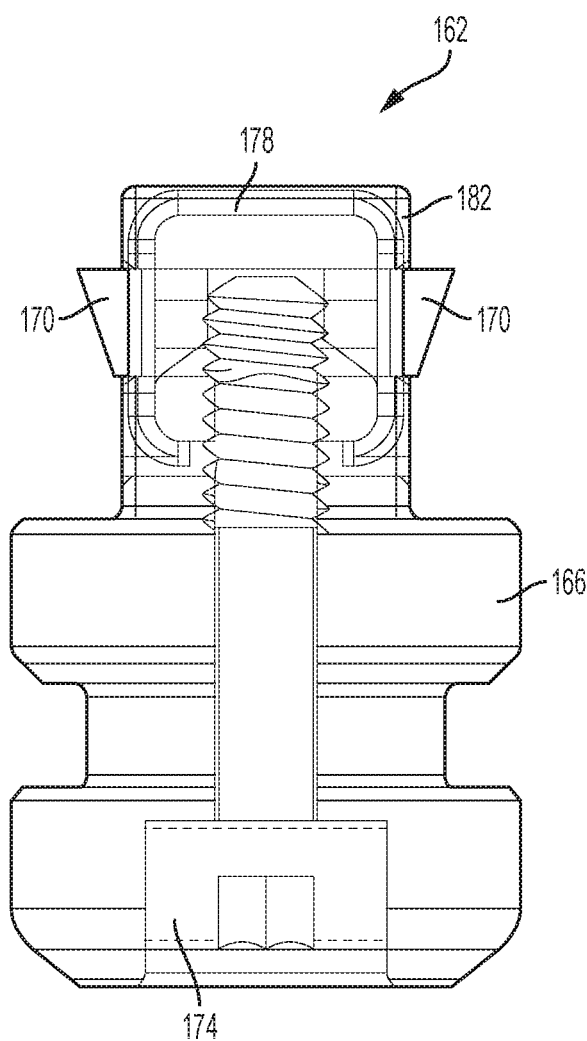
FIG. 16 is a cross-sectional view of the anchor of FIG. 14.

FIGS. 14-16 illustrate another anchor 162 of a security apparatus. The anchor 162 attaches to a portable electronic device and may be used with the lock head 30 and the cable 34 shown in FIG. 1. The anchor 162 is similar to the anchor 62 shown in FIGS. 5-8. Only differences between the anchors 62, 162 are described below.

The illustrated anchor 162 includes a body 166, two wedges or tapered projecting members 170, and a fastener 174. In the illustrated embodiment, the anchor 162 also includes a wire clip 178 that wraps around an end of an insertable portion 182 and engages both of the wedges 170. Each wedge 170 includes a channel 184 formed in the engagement surface and that receives a portion of the wire clip 178. The wire clip 178 retains both of the wedges 170.

Figure 18:
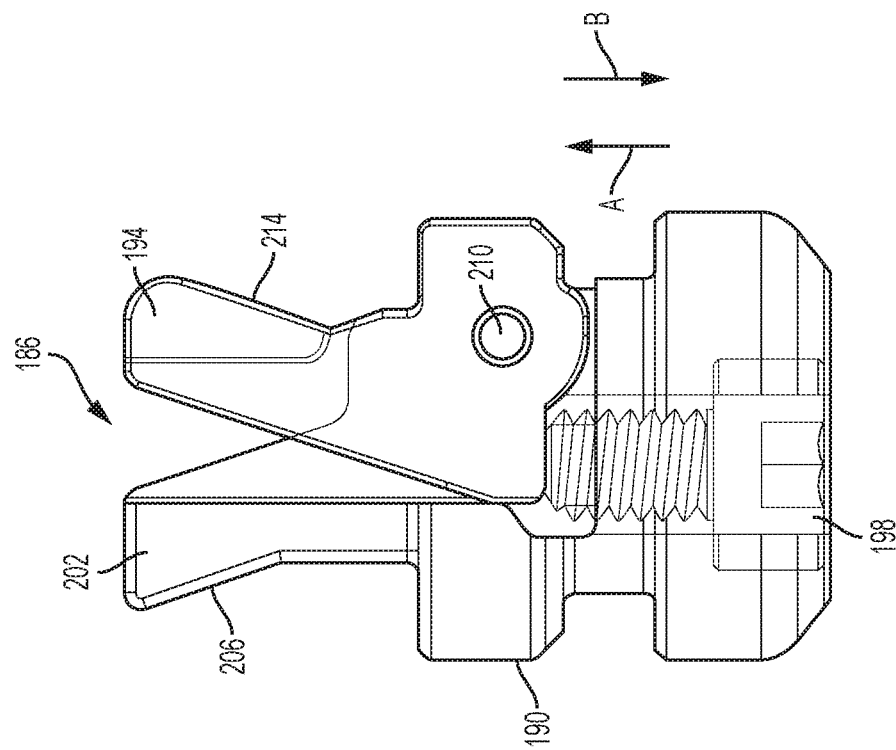
FIG. 18 is a cross-sectional view of the anchor of FIG. 17.
Figure 17:
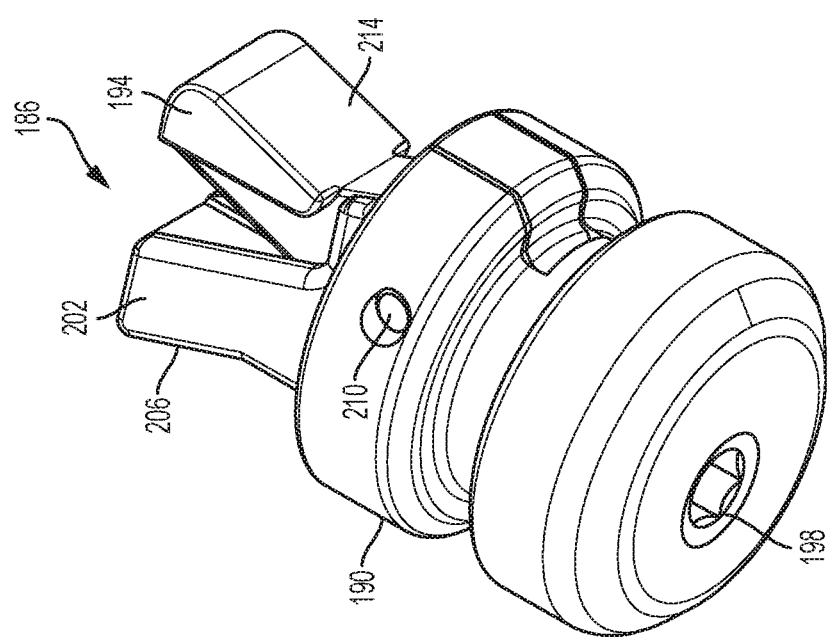
FIG. 17 is a perspective view of another anchor embodying the invention.

FIGS. 17-18 illustrate another anchor 186 of a security apparatus. The anchor 186 attaches to a portable electronic device and may be used with the lock head 30 and the cable 34 shown in FIG. 1. The anchor 186 is similar to the anchor 62 shown in FIGS. 5-8. Only differences between the anchors 62, 186 are described below.

The illustrated anchor 186 includes a body 190, a wedge or tapered projecting member 194, and a fastener 198. The body 190 includes an insertable portion 202 having a first engagement surface 206 that is obliquely angled relative to a longitudinal axis of the anchor 186. The first engagement surface 206 is configured to engage one of the side walls 54 (FIG. 4) of the portable electronic device 14.

The wedge 194 is pivotally coupled to the body 190 by a pin 210. The wedge 194 includes a second engagement surface 214 that is obliquely angled relative to the longitudinal axis of the anchor 186 when the wedge 194 is pivoted into the engaged position shown in FIGS. 17 and 18. The second engagement surface 214 is configured to engage the other side wall 54 (FIG. 4) of the portable electronic device 14.

The fastener 198 is movable to selectively engage the wedge 194. As the fastener 198 moves toward the wedge 194 (i.e., in the direction of arrow A), the fastener 198 pushes the wedge 194 to pivot the wedge 194 about the pin 210. In this position, the second engagement surface 214 of the wedge 194 spreads apart or extends from the first engagement surface 206 of the insertable portion 202 to secure the anchor 186 within the slot 38. As the fastener 198 moves away from the wedge 194 (i.e., in the direction of arrow B), the fastener 198 disengages the wedge 194 such that the wedge 194 is free to pivot back or retract toward insertable portion 202. In this position, the second engagement surface 214 of the wedge 194 moves toward the first engagement surface 206 of the insertable portion 202, allowing the insertable portion 202 and the wedge 194 to be inserted into or removed from the slot 38.

Figure 20:
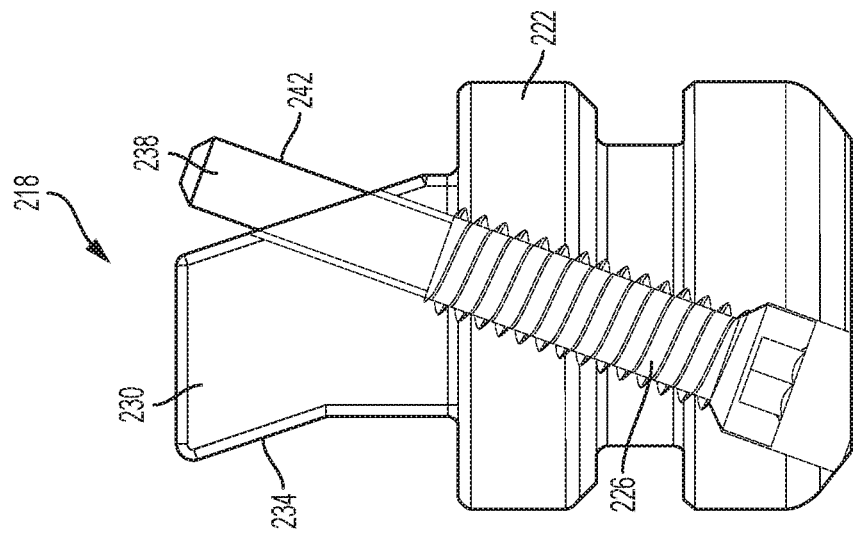
FIG. 20 is a cross-sectional view of the anchor of FIG. 19.
Figure 19:
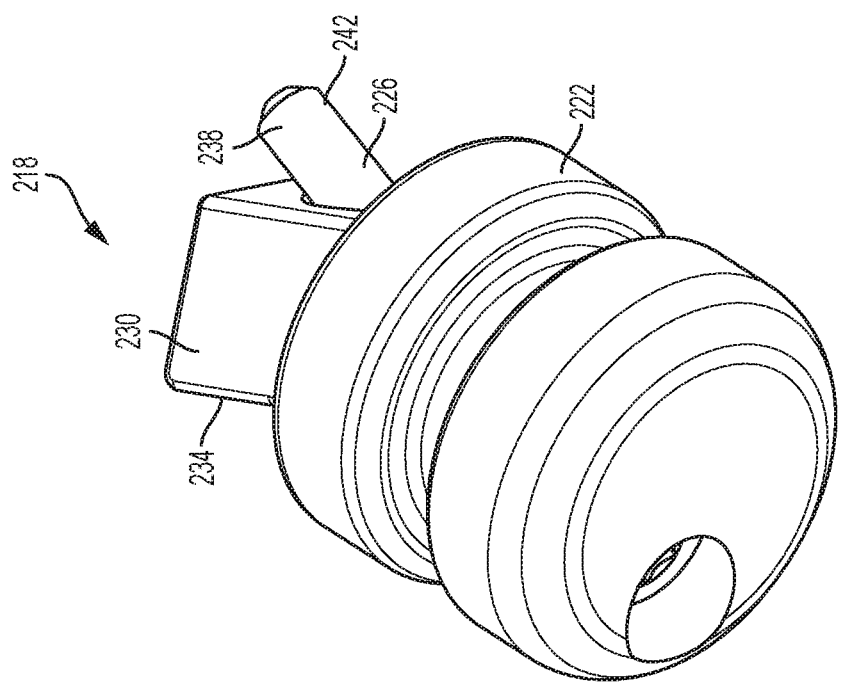
FIG. 19 is a perspective view of yet another anchor embodying the invention.

FIGS. 19-20 illustrate another anchor 218 of a security apparatus. The anchor 218 attaches to a portable electronic device and may be used with the lock head 30 and the cable 34 shown in FIG. 1. The anchor 218 is similar to the anchor 62 shown in FIGS. 5-8. Only differences between the anchors 62, 218 are described below.

The illustrated anchor 218 includes a body 222 and a fastener 226. The body 222 includes an insertable portion 230 having a first engagement surface 234 that is obliquely angled relative to a longitudinal axis of the anchor 218. The first engagement surface 234 is configured to engage one of the side walls 54 (FIG. 4) of the portable electronic device 14.

In the illustrated embodiment, part of the fastener 226 functions as a wedge or tapered projecting member. In particular, the fastener 226 extends through the body 222 at an oblique angle relative to the longitudinal axis of the anchor 218. A distal end portion 238 of the fastener 226 extends out from a side of the insertable portion 230 opposite the first engagement surface 234. The distal end portion 238 has a second engagement surface 242 that is configured to engage the other side wall 54 (FIG. 4) of the portable electronic device 14.

Figure 22:
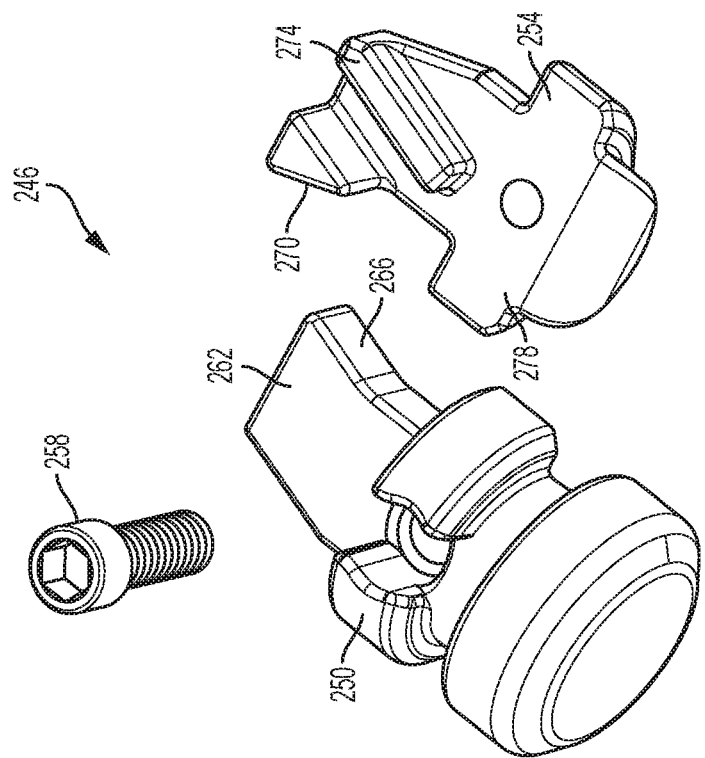
FIG. 22 is an exploded view of the anchor of FIG. 21.
Figure 21:
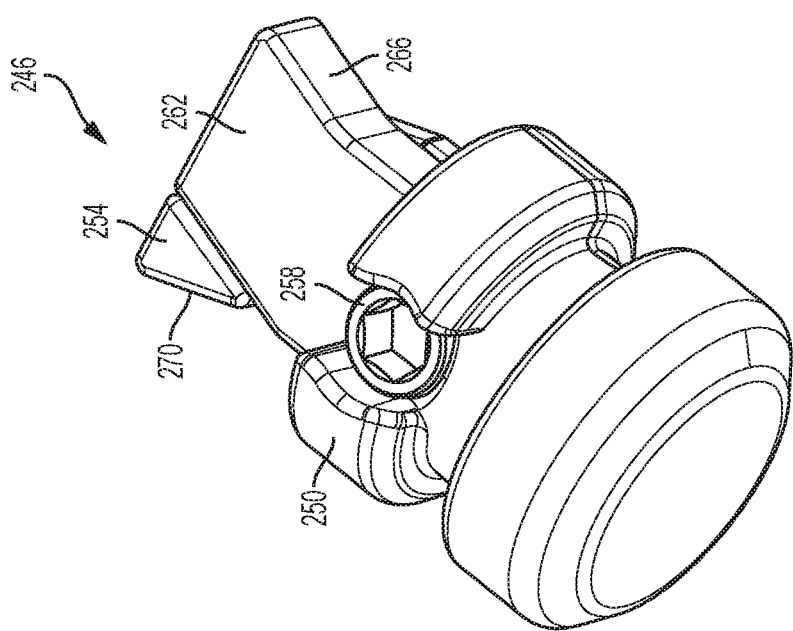
FIG. 21 is a perspective view of still another anchor embodying the invention.

FIGS. 21-22 illustrate another anchor 246 of a security apparatus. The anchor 246 attaches to a portable electronic device and may be used with the lock head 30 and the cable 34 shown in FIG. 1. The anchor 246 is similar to the anchor 62 shown in FIGS. 5-8. Only differences between the anchors 62, 246 are described below.

The illustrated anchor 246 includes a body 250, a wedge or tapered projecting member 254, and a fastener 258. The body 250 includes an insertable portion 262 having a first engagement surface 266 that is obliquely angled relative to a longitudinal axis of the anchor 246. The first engagement surface 266 is configured to engage one of the side walls 54 (FIG. 4) of the portable electronic device 14.

The wedge 254 includes a second engagement surface 270 that is obliquely angled relative to the longitudinal axis of the anchor 246. The second engagement surface 270 is configured to engage the other side wall 54 (FIG. 4) of the portable electronic device 14. In the illustrated embodiment, the wedge 254 is not supported by the body 250. Instead, the wedge 254 includes a projection 274 extending from a surface 278 of the wedge 254 that faces the insertable portion 262. The projection 274 forms a track along which the body 250 can move (e.g., slide).

To assemble the anchor 246, the wedge 254 is first inserted into the slot 38 of the portable electronic device 14. Then, the body 250 is slid along the projection 274 of the wedge 254 and into the slot 38 so that the first engagement surface 266 of the insertable portion 262 engages one side wall 54 of the portable electronic device 14 and the second engagement surface 270 of the wedge 254 engages the other side wall 54 of the portable electronic device 14. Once the body 250 is properly positioned and aligned on the wedge 254, the fastener 258 is threaded into the body 250 and the wedge 254 to secure the body 250 and the wedge 254 together. In this position, the anchor 246 is inhibited from being removed from the slot 38.

To remove the anchor 246 from the slot 38, the fastener 258 is first unthreaded from the body 250 and the wedge 254. Then, the body 250 is slid out of the slot 38. Once the body 250 is removed, the wedge 254 can also be removed from the slot 38.

Various features of the invention are set forth in the following claims.

What is claimed is:

1. A security apparatus for a portable electronic device having a slot, the security apparatus comprising:
   a body including an insertable portion configured to be inserted into the slot of the portable electronic device, and a boss extending from the insertable portion and positioned outside of the slot, the boss configured to attach to a lock head;
   a wedge supported at least partially within the insertable portion of the body, the wedge being movable relative to the insertable portion between a first position, in which the wedge extends out of the insertable portion and is configured to engage a surface of the portable electronic device that defines the slot, and a second position, in which the wedge is retracted relative to the first position and is configured to disengage the surface of the portable electronic device that defines the slot, and a fastener coupled to the body and selectively engageable with the wedge to move the wedge to the first position, the fastener including a head adjacent the boss, a stem extending from the head into the insertable portion, and a threaded portion formed on the head.

2. The security apparatus of claim 1, wherein the wedge is a first wedge, and further comprising a second wedge supported at least partially within the insertable portion adjacent an opposite side of the insertable portion of the body from the first wedge and being movable relative to the insertable portion between a first position, in which the second wedge extends out of the insertable portion and is configured to engage another surface of the portable electronic device that defines the slot, and a second position, in which the second wedge is retracted relative to the first position and is configured to disengage the another surface of the portable electronic device that defines the slot.

3. The security apparatus of claim 2, wherein the fastener is selectively engageable with the first and second wedges to move the wedges to their respective first positions.

4. The security apparatus of claim 3, wherein each of the first and second wedges includes a radially inwardly-facing surface that is selectively engaged by the fastener to move the first and second wedges to their respective first positions.

5. The security apparatus of claim 4, wherein the radially inwardly-facing surfaces of the first and second wedges include a tapered lead-in portion to facilitate smooth extension of the wedges upon initial engagement with the fastener.

6. The security apparatus of claim 3, wherein the first and second wedges translate linearly between the first and second positions.

7. The security apparatus of claim 3, wherein the first and second wedges pivot relative to one another between the first and second positions.

8. The security apparatus of claim 3, wherein the fastener is a threaded screw, and wherein rotation of the screw causes translation of the screw along a longitudinal axis of the body that selectively moves the screw into or out of engagement with the first and second wedges.

9. The security apparatus of claim 2, further comprising a retention member coupled with at least one of the first and second wedges, the retention member being one of a pin or a spring.

10. The security apparatus of claim 9, wherein the retention member is at least partially positioned within a recess in at least one of the first and second wedges.

11. The security apparatus of claim 1, wherein the insertable portion has a rectangular cross section.

12. An anchor configured to be installed into a slot in a portable electronic device and to be subsequently engaged by a locking head of a lock in order to secure the portable electronic device to an immovable object, the anchor comprising:

a body including an insertable portion configured to be inserted into the slot of the portable electronic device, and a boss extending from the insertable portion and positioned outside of the slot, the boss having a cap, a ring structure, and an annular recess positioned between the cap and the ring structure, the boss configured to attach to a lock head; and a first tapered projecting member coupled to the insertable portion of the body, and a second tapered projecting member coupled to an opposite side of the insertable portion from the first tapered projecting member, the first and second tapered projecting members being movable relative to the insertable portion between an extended position, in which the tapered projecting members extend in opposite directions from within the insertable portion to engage respective surfaces of the portable electronic device that defines the slot, and a retracted position, in which the tapered projecting members retract within the insertable portion to disengage the respective surfaces of the portable electronic device that defines the slot, wherein the anchor further comprises a fastener coupled to the body and selectively engageable with the first and second tapered projecting members to move the tapered projecting members to the extended position, the fastener including a head adjacent the boss, a stem extending from the head into the insertable portion, and a threaded portion formed on the head.

13. The anchor of claim 12, wherein the tapered projecting members translate linearly between the extended and retracted positions.

14. The anchor of claim 12, wherein the fastener is a threaded screw, and wherein rotation of the threaded screw causes translation of the threaded screw along a longitudinal axis of the body that selectively moves the threaded screw into or out of engagement with the first and second tapered projecting members.

15. The anchor of claim 12, wherein each of the first and second tapered projecting members includes a radially inwardly-facing surface that is selectively engaged by the fastener to move the first and second tapered projecting members to the extended position.

16. The anchor of claim 15, wherein the radially inwardly-facing surfaces of the first and second tapered projecting members include a tapered lead-in portion to facilitate smooth extension of the tapered projecting members upon initial engagement with the fastener.

17. The anchor of claim 12, further comprising a retention member coupled with at least one of the first and second tapered projecting members, the retention member being one of a pin, or a spring.

18. The anchor of claim 17, wherein the retention member is at least partially positioned within a recess in at least one of the first and second tapered projecting members.

* * * * *